United States Patent [19]

Daniels

[11] Patent Number: 4,606,003
[45] Date of Patent: Aug. 12, 1986

[54] MAILING SYSTEM PERIPHERAL INTERFACE WITH REPLACEABLE PROM FOR ACCESSING MEMORIES

[75] Inventor: Edward P. Daniels, Bridgeport, Conn.

[73] Assignee: Pitney Bowes Inc., Stamford, Conn.

[21] Appl. No.: 430,220

[22] Filed: Sep. 30, 1982

[51] Int. Cl.[4] ............................................. G06F 12/12
[52] U.S. Cl. ................................................... 364/200
[58] Field of Search ................................. 364/200, 900

[56] References Cited

U.S. PATENT DOCUMENTS

| 3,934,227 | 1/1976 | Worst | 364/200 |
|---|---|---|---|
| 4,028,682 | 6/1977 | Weber et al. | 364/900 |
| 4,028,683 | 6/1977 | Divine et al. | 364/900 |
| 4,141,068 | 2/1979 | Mager et al. | 364/200 |
| 4,377,852 | 3/1983 | Thompson | 364/900 |
| 4,456,966 | 6/1984 | Bringol et al. | 364/900 |
| 4,473,877 | 9/1984 | Tulk | 364/200 |

Primary Examiner—Gareth D. Shaw
Assistant Examiner—John J. Salotto
Attorney, Agent, or Firm—Robert H. Whisker; David E. Pitchenik; William D. Soltow, Jr.

[57] ABSTRACT

An interface between a system processor of an automated mailing system and selected peripheral devices carries peripheral support hardware and software for communication with the peripherals. The interface includes a board having a memory wherein programs for formatting communications with the peripherals are stored. A working memory for the temporary storage of commands and data for communication to the peripherals and a peripheral controller for establishing a communications link with a selected peripheral are also carried on the interface board. A replaceable PROM is carried on the interface for accessing the output enable pins of the program and working memories. The PROM is replaced in the field when a different program or working memory is to be substituted.

5 Claims, 4 Drawing Figures

MAILING SYSTEM PERIPHERAL INTERFACE WITH REPLACEABLE PROM FOR ACCESSING MEMORIES

RELATED APPLICATION

The present invention deals with a postage system peripheral interface which includes a communication program memory utilized by a system processor for formatting communication with mailing system peripheral devices as disclosed in a copending application of Daniel F. Dlugos et al entitled Mailing System Peripheral Interface with Communications Formatting Memory, Ser. No. 235,252, filed Feb. 17, 1981 and assigned to the assignee of the present invention, now issued as U.S. Pat. No. 4,466,079. The present invention is applicable for accessing the program memory of such interface, as well as the memories of the interface disclosed in a further application of Daniel F. Dlugos et al entitled Mailing System Interface Between a Scale System Processor and a Serial Data Bus Which Interconnects Peripheral Subsystems, Ser. No. 430,219, filed Sept. 20, 1982.

BACKGROUND OF THE INVENTION

1. Field of the Invention

This invention relates generally to mailing systems and more particularly to the accessing of memories employed by a system processor for controlling the operation of peripheral devices.

2. Brief Description of the Prior Art

The upgrading of processing systems by replacement and substitution of existing memory chips with larger capacity memories was a task which was well within the capabilities of field service personnel. Unfortunately, replacement of a memory chip with one of larger capacity often required changes in existing decoding circuitry due to different pin number utilization.

While field personnel were not reluctant to replace a single chip or an entire board, there has been a general tendency to attempt to avoid more detailed servicing such as soldering or snipping jumper wires which may be required in conjunction with the installation of replacement memories.

Field service personnel found it much simpler and preferred to replace an entire board which also carried the memory decoding circuitry rather than a memory chip itself. This practice resulted in excessive costs for minor revisions.

SUMMARY OF THE INVENTION

A program memory and a working memory carried on a communications interface card are accessed by a system processor through a PROM. The PROM is programmed to output the address of a selected memory upon receipt of an incoming address from the system processor. When a substitute memory is employed, an associated replacement PROM is also substituted and the replacement PROM provides the address for accessing the substitute memory upon receipt of an appropriate incoming address from the system processor.

Optionally, a switch bank is employed between the output of the PROM and the memories to be accessed so that replacement memories may be accessed by varying switch positions in lieu of substituting a PROM with a different decoding program.

From the above compendium, it will be appreciated that it is an aspect of the present invention to provide a system for accessing memories of the general character described which is not subject to the disadvantages of the prior art aforementioned.

A further aspect of the present invention is to provide a mailing system interface of the general character described having memories which can be easily upgraded in the field.

Another feature of the present invention is to provide a mailing system interface of the general character described having a simplified system for decoding memory addresses.

A further aspect of the present invention is to provide a mailing system interface of the general character described which includes replaceable memories accessed by a replaceable decoding memory for improved versatility in upgrading.

Another aspect of the present invention is to provide a mailing system interface of the general character described which facilitates low cost field modifications.

Other features and aspects of the present invention in part will be obvious and in part will be pointed out hereinafter.

With these aims in view, the invention finds embodiment in certain combinations of elements, arrangements of parts and series of steps by which the objects aforementioned and certain other aspects and features are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
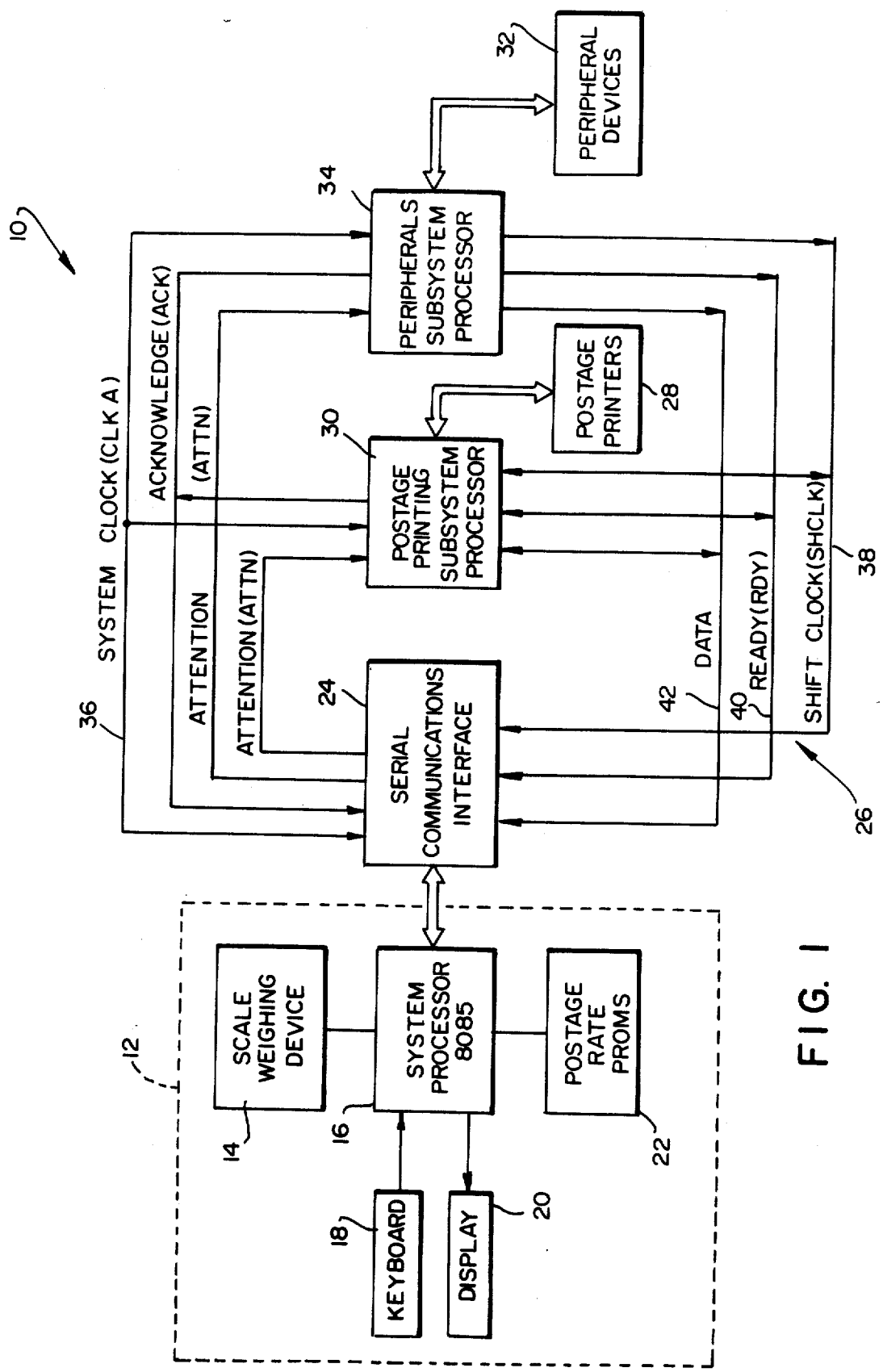
FIG. 1 is a schematized block diagram of a typical mailing system interface constructed in accordance with and embodying the present invention interconnecting a postage value determining system processor with a serial data bus for communications between the system processor and a plurality of peripheral devices.

Referring now in detail to the drawings, the reference numeral 10 denotes generally a composite automated mailing system which includes a processor controlled stand-alone postage scale 12. The scale 12 includes a weighing device 14 having a tray or platform for receiving a parcel to be mailed. The weighing device 14 is interconnected to a main system processor 16 which is programmed to determine the requisite postage or other transportation charge for the parcel. In most instances, the transportation charge is based upon the parcel weight, class of transportation and the distance to its destination.

The data necessary for determination of postage, e.g. destination operands, etc., is entered at the keyboard 18 and corresponding signals are transmitted to the system processor 16. Keyboard and calculated information are indicated at a display 20.

Parcel weight indication signals are generated by a detector at a weighing device 14. The detector may comprise an optical deflection detector or a strain gauge apparatus and a corresponding analog to digital converter, which devices are known to those of skill in the art and do not form part of the present invention hereinafter described.

With article weight, class of transporation and destination operands entered, the system processor 16 determines the requisite postage by reference to a postage rate PROM 22 and provides a signal to the display 20 for indicating the determined postage amount.

A suitable microprocessor for implementation as the system processor 16 is an Intel 8085 processor available from Intel Corporation, Santa Clara, Calif. The foregoing general mode of operation of the scale 12 is well known to those of skill in the art and specifically illustrated in U.S. Pat. No. 4,135,662 entitled Operator Prompting System issued Jan. 23, 1979 to Daniel F. Dlugos and assigned to the assignee of the present invention.

In the copending application of Daniel F. Dlugos et al entitled Mailing System Interface Between a Scale System Processor and a Serial Data Bus Which Interconnects Peripheral Subsystems, filed simultaneously herewith, an interface was disclosed between a postage value determining system processor and a serial data bus through which various peripheral device subsystem processors communicate. The interface included a first communications processor interconnected to a second communications processor by an interprocessor channel. The present invention is directed to an improved system for addressing various memories used by the system processor in conjunction with communications with the peripherals.

Accordingly, in the environment of the invention depicted in FIG. 1, the mailing system 10 includes a communications interface 24 interconnecting the system processor 16 with a serial data bus 26. The interface 24 permits communications between the system processor 16 and peripheral devices such as postage printers 28 controlled by a postage printing subsystem processor and other peripheral devices denoted generally by the reference numeral 32 which are controlled by a peripheral subsystem processor 34.

As more fully described in Pat. No. 4,271,470, communications along the serial data bus 26 are controlled by system clock signals (CLK A) generated within a Rockwell PPS-4/1 processor which are applied to the subsystem processors over a common clock line 36. In addition, a shift clock signal (SHCLK) is transmitted along a shift clock line 38. A ready signal (RDY) is carried on a ready signal line 40 and data is transmitted over serial data line 42.

Figure 2:
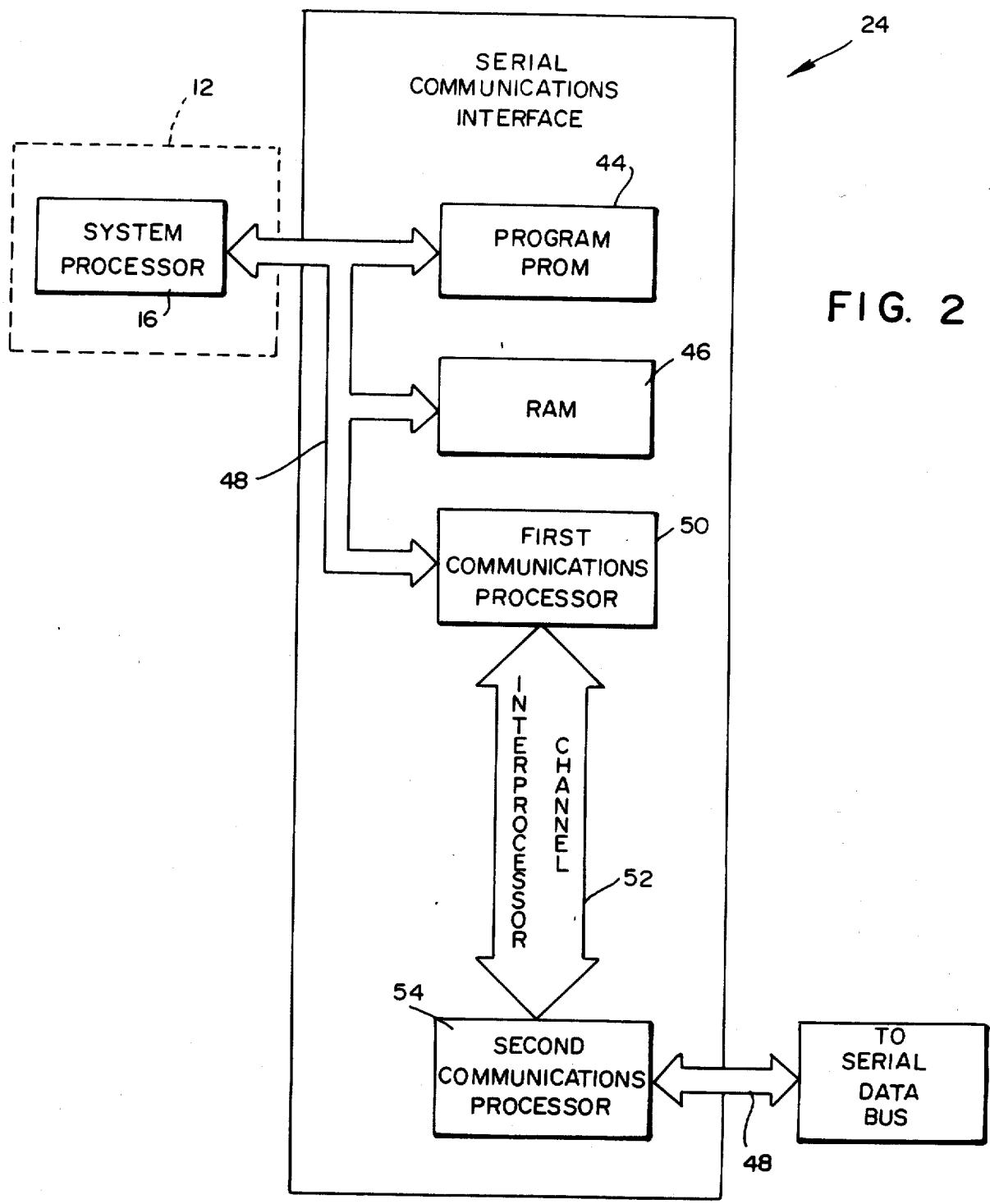
FIG. 2 is a schematized block diagram of a typical board upon which the interface is carried and illustrating a decoding PROM accessed by a system processor for addressing a program PROM and a working memory RAM carried on the board.

Referring now to FIG. 2, it will be seen that the system processor 16 accesses a communications PROM 44 to obtain a communications routine compatible with the peripheral devices in the mailing system 10. In addition, a RAM 46 is accessed to obtain command/data working memory for communications routines. The system processor 16 reads the program PROM 44 and the RAM 46 through a data bus 48. In addition, the system processor accesses a first communications processor 50 through the data bus 48. As more fully described in the copending application filed simultaneously herewith, an interprocessor channel 52 interconnects the first communications processor with a second communications processor 54 which is interconnected to the peripheral subsystem processors through the serial data bus.

It should be understood that the present invention should not be considered to be limited to the environment of the mailing system herein described but may be applicable to other mailing systems such as the mailing system described in the copending related U.S. Pat. No. 4,466,079, incorporated herein by reference.

Figure 3:
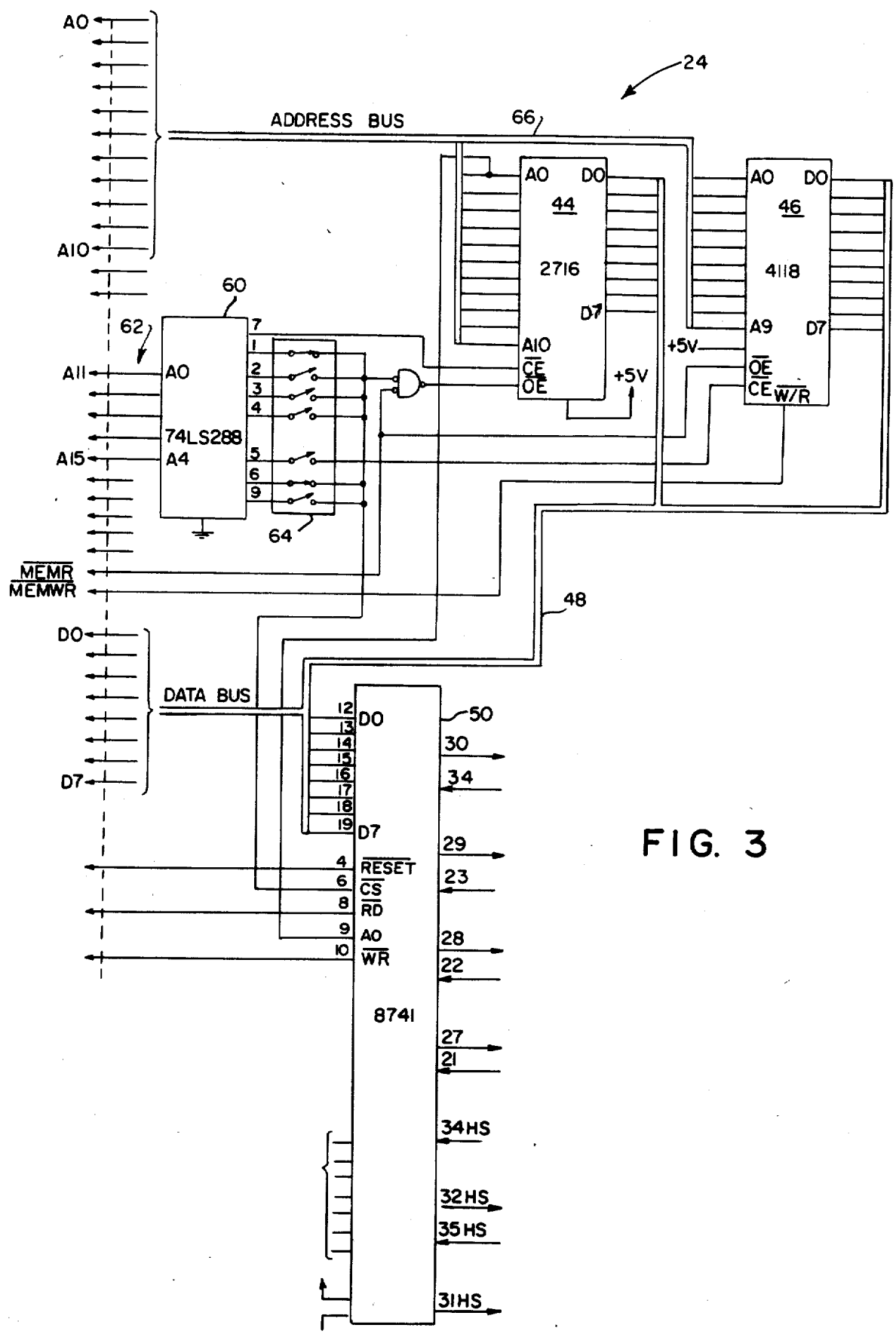
FIG. 3 comprises a schematic illustration of the portion of the interface board which is in communication with the system processor including the decoding PROM, the program memory, a working memory, and a first communications processor.
Figure 4:
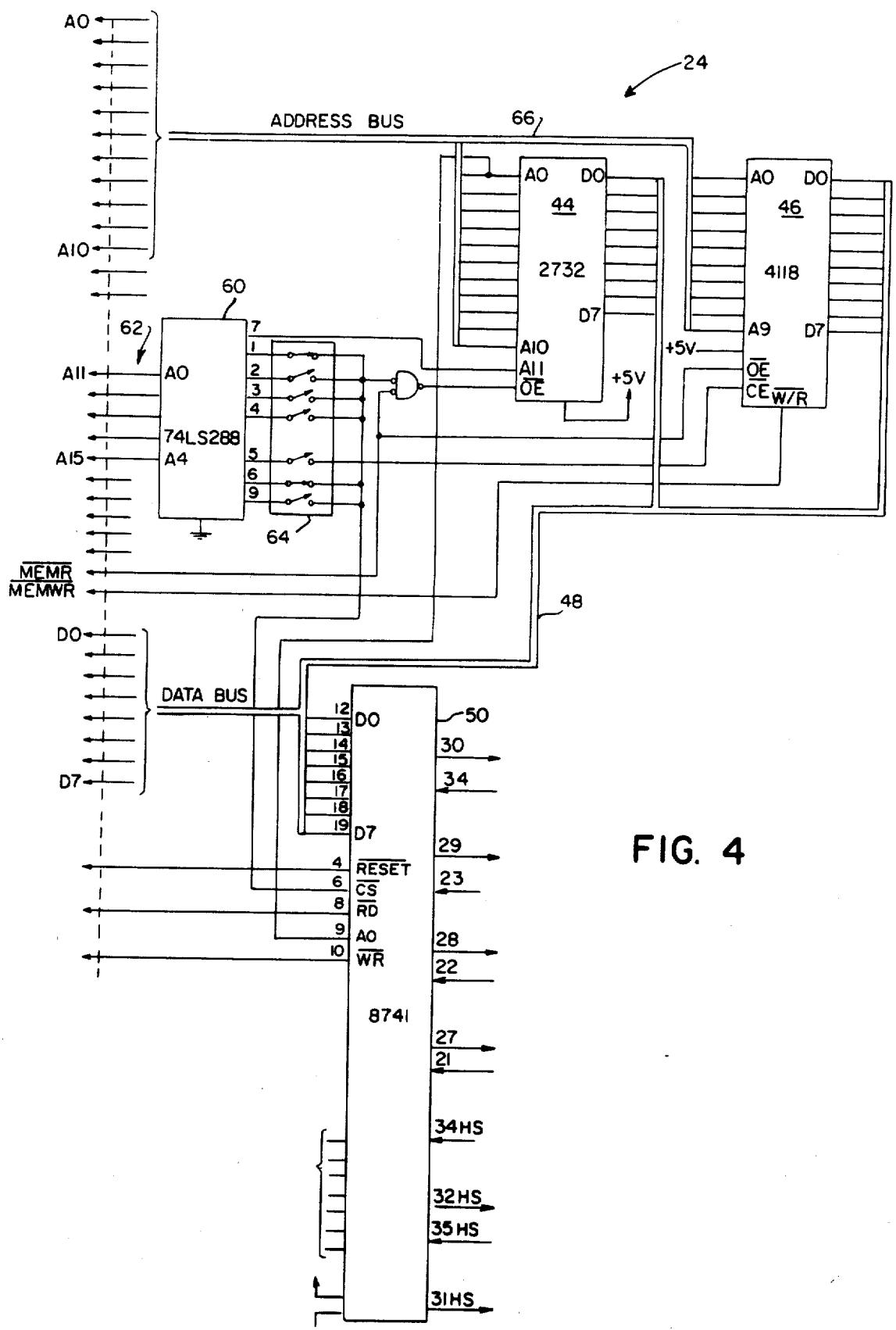
FIG. 4 comprises a schematic illustration of the portion of the interface board which is in communication with the system processor including an alternative decoding PROM, and alternative program memory with expanded capacity, a working memory, and a first communications processor.

Referring to FIG. 3, it will be seen that the system processor 16 accesses the program memory 44 and the working memory 46 by providing a suitable address along several address lines 62 to a decoding PROM 60. The decoding PROM, upon receipt of a recognized address, is programmed to output an address to access either the program PROM 44 or the memory 46 through lines extending to the chip enable pins of both memories 44, 46 and the $\overline{OE}$ enable pin of the memory 44. A more detailed explanation of the manner in which the memory addresses for the memories 44, 46 are decoded by the PROM 60 will be evident from an examination of FIG. 3. It should be understood, however, that portions of the interface 24 not relevant to an analysis of the present invention such as the interprocessor channel and the second communications processor have been deleted from FIG. 3.

The decoding PROM 60 is addressed by the system processor over the five address lines 62 which comprise a portion (lines A11–A15) of a system processor address bus 66.

When the system processor 16 desires to access a particular memory such as the memory 44 or the memory 46, a suitable address is placed on the address lines 62 and the decoder PROM 60 is programmed to output a signal on a designated pin associated with the enable pins of the selected memory 44, 46. The specific pins presently indicated as designating the enables for the memories 44, 46, respectively, are the pin numbers 7, 1 and 6 of the decoder PROM 60. A switch bank 64 is indicated as interconnecting the output pins 1–6 and 9 of the decoding PROM 60 with the enable pins of the memories 44, 46.

It should be understood that the memories 44, 46 are addressed by the system processor 16 through the address bus 66 and read through the data bus 48.

In the typical embodiment illustrated in FIG. 3, the program memory comprises a 2716 erasable 2K PROM. With such memory, the $\overline{OE}$ pin must be held low so that the memory is always enabled. In accordance with the invention, the decoder PROM 60 is programmed to always have a low output on pin 7 regardless of the input address. In previous systems a resistor to ground was tied to the $\overline{OE}$ pin of the PROM 44.

In the event it is desired to include additional communications programs requiring extended memory space, the 2716 PROM may be replaced by a larger PROM, for example a 4K PROM such as 2732. If a 2732 PROM is employed, the output enable is no longer located at the same pin number position, but such position is allocated to address line 11. In order to accommodate the new program memory 44, the decoding PROM 60 is replaced with a PROM programmed to provide an appropriate enable signal for accessing the replacement program memory 44 and permitting the system processor to access the expanded memory through its address line 11. The replacement decoder PROM will output at its pin 7 whatever appears at its address pin 10. Thus, the decoding PROM which is replaced is programmed to select and address not only the type of memory being accessed but the size of the memory.

Alternatively, the decoding PROM 60 may be programmed with a plurality of different addresses so that in lieu of changing the decoding PROM when a substitute program or working memory (44, 46) is utilized, the positions of the switches on the switch bank 64 may be varied.

While the invention has been described with reference to a mailing system interface, it will be appreciated that the present invention may be employed in various automated and semiautomated systems wherein economical field substitution of memories with expanded capacities is desired.

Thus, it will be seen that there is provided a system for simplified accessing of memories and low cost expansion of memories in processing systems which achieves the various features and aspects of the present invention and which is well suited to meet the conditions of practical usage.

As various changes might be made in the interface and mailing system as set forth herein, it is to be understood that all matter herein described or shown in the accompanying drawings is to be interpreted as illustrative and not in a limiting sense.

Having thus described the invention, there is claimed as new and desired to be secured by Letters Patent:

1. A processing system for use with a memory, having memory expansion capability to replace a first memory by a second memory having a larger storage capacity, said first memory comprising a first memory chip having a first number of address inputs and a plurality of enable inputs, and said second memory comprising a second memory chip, the input configuration of which differs only in that selected inputs of said memories, which are used as enable inputs for said first memory, are used as high order address inputs for said second memory so as to allow addressing of the additional storage capacity of said second memory, said system comprising:

(a) a first connector means for mounting a memory chip;

(b) a second connector means for mounting a ROM chip, said second connector means being operably connected to said first connector means so that selected outputs of said ROM chip are connectable to said selected inputs and at least one other output of said ROM chip being operably connectable to at least one other of said plurality of enable inputs;

(c) a plurality of address lines, a low order group of said address lines being connectable to said first number of address inputs through said first connector and the remaining ones of said address lines being connectable to the address inputs of said ROM chip through said second connector;

(d) data lines connectable to the data outputs of said memory through said first connector;

(e) control lines connectable to said memory and to said ROM chip through said first and second connectors respectively;

(f) system processor means operatively connected to said address, data, and control lines to transfer data to and from said memory;

(g) switch means for selectively operably connecting said other outputs of said ROM chip to said remaining inputs of said plurality of enable inputs;

(h) whereby said system may operate with said first memory by inserting said first memory chip in said first connector and a ROM chip in said second connector, said ROM chip being programmed so that said selected outputs of said ROM chip always generate an enable signal on said selected inputs of said memory when said memory is addressed and a high order group of said memory is addressed and a high order group of said remaining address lines asserts a pre-selected value on said address inputs of said ROM chip and said other output of said ROM chip is selected to generate an enable signal on said remaining enable signal inputs by said remaining enable signal inputs by said switch means only when said high order group of said remaining address lines asserts said preselected value on said address inputs of said ROM chip; and, (i) whereby said system may operate with said second memory by inserting said second memory chip in said first connector, changing the setting of said switch means to change the selection of said other output of said ROM chip, and asserting a second preselected value on said high order group of said remaining address lines.

2. A processing system as described in claim 1 wherein said first and second ROM chips each comprises a plurality of said other outputs and said plurality of other outputs are connectable to switch means, through said second connector, for selectively and operably connecting sub-groups of said plurality of other outputs of either said first or said second ROM chip inserted in said second connector to said remaining inputs of said plurality of enable inputs, whereby said ROM chip may be programmed so that selected ones of said sub-groups of other outputs will generate an enable signal on said remaining enable signal inputs in response to pre-selected values ascerted by said high order group of said remaining address lines, and whereby further an operator may select a particular one of said preselected values to enable said memory by appropriately setting said switch means.

3. A processing system as described in claim 1 wherein said plurality of enable inputs consists of a first input which is said selected enable input and a second input which is said remaining enable input.

4. A processing system as described in claim 2 wherein said plurality of enable inputs consists of a first input which is said selected enable input and a second input which is said remaining enable input.

5. A processing system for use with a memory, having memory expansion capability to replace a first memory by a second memory having a larger storage capacity, said first memory comprising a first memory chip having a first number of address units and a plurality of enable inputs, and said second memory comprising a second memory chip, the input configuration of which differs only in that selected inputs of said memories, which are used as enable inputs for said first memory, are used as high order address inputs for said second memory so as to allow addressing of the additional storage capacity of said second memory, said system comprising:

(a) first connector means for mounting a memory chip;

(b) a second connector means for mounting a ROM chip, said second connector means being operably connected to said first connector means so that selected outputs of said ROM chip are connectable to said selected inputs and at least one other output of said ROM chip being operably connectable to at least one other of said plurality of enable inputs;

(c) a plurality of address lines, a low order group of said address lines being connectable to said first number of address inputs through said first connector and the remaining ones of said address lines being connectable to the address inputs of said ROM chip through said second connector;

(d) data lines connectable to the data outputs of said memory through said first connector;

(e) control lines connectable to said memory and to said ROM chip through said first and second connectors respectively;

(f) system processor means operatively connected to aid address, data, and control lines to transfer data to and from said memory;

(g) switch means for selectively operably connecting said other outputs of said ROM chip to said remaining inputs of said plurality of enable inputs;

(h) whereby said system may operate with said first memory by inserting said first memory chip in said first connector and a ROM chip in said second connector, said ROM chip being programmed so that said selected outputs of said ROM chip always generate an enable signal on said selected inputs of said memory when said memory is addressed and a high order group of said remaining address lines asserts a pre-selected value on said address inputs of said ROM chip and said other output of said ROM chip is selected to generate an enable signal on said remaining enable signal inputs by said switch means only when said high order group of said switch means only when said high order group of said remaining address lines asserts said pre-selected value on said address inputs of said ROM chip; and, (i) whereby said system may operate with said second memory chip in said first connector, changing the setting of said switch means to change the selection of said other output of said ROM chip, and asserting a second pre-selected value on said high order group of said remaining address lines.

* * * * *